Feb. 14, 1967 — I. J. KRAUSE — 3,303,519
HONEYCOMB DEVICE FOR EXTERIOR EXTRACTION OF HONEY
Filed April 14, 1965 — 2 Sheets-Sheet 1
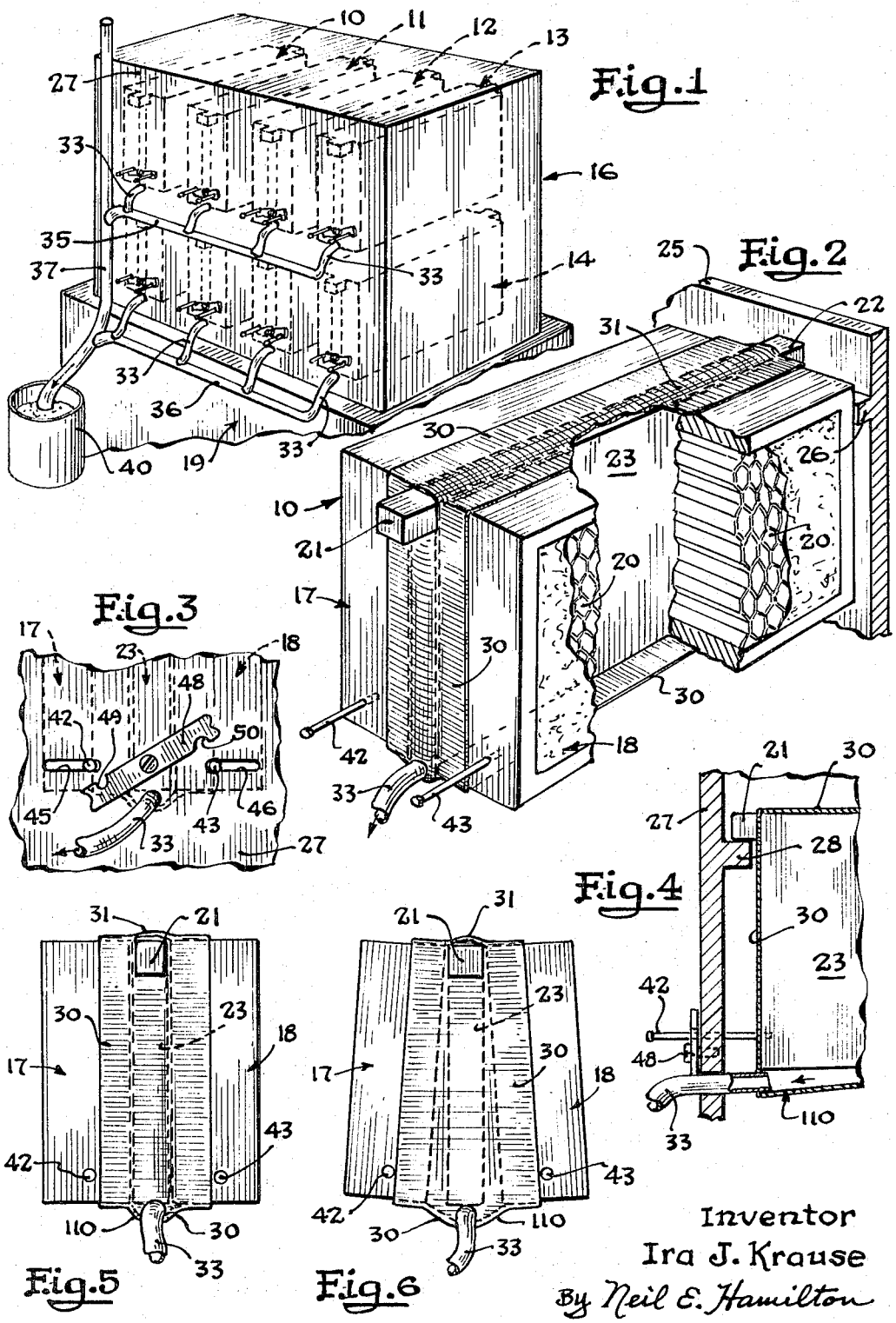
Inventor
Ira J. Krause
By Neil E. Hamilton
Attorney

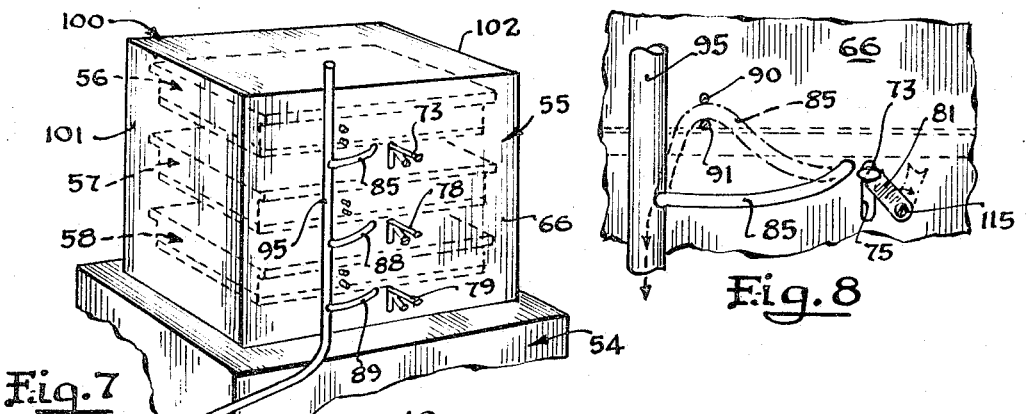
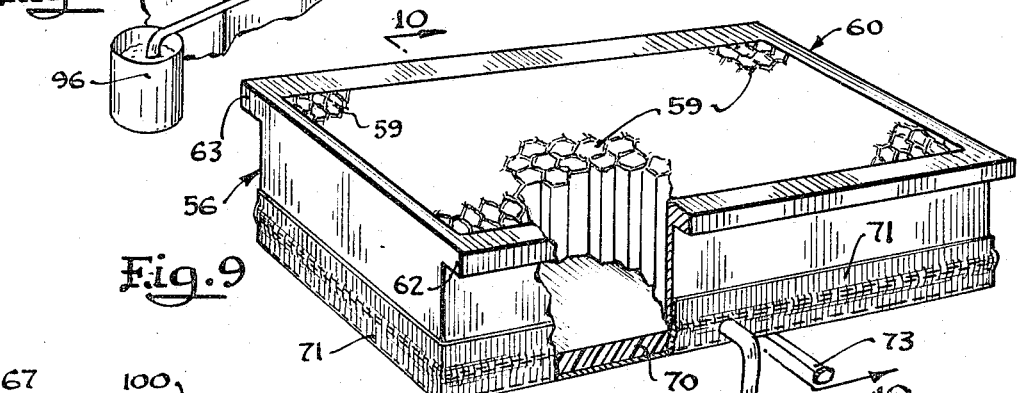
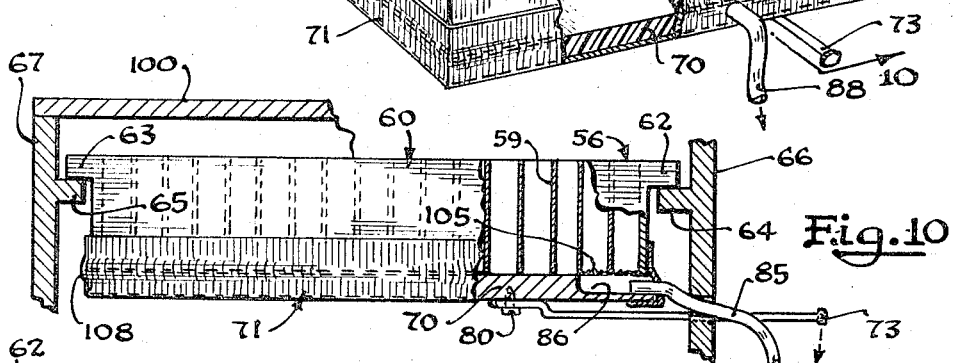
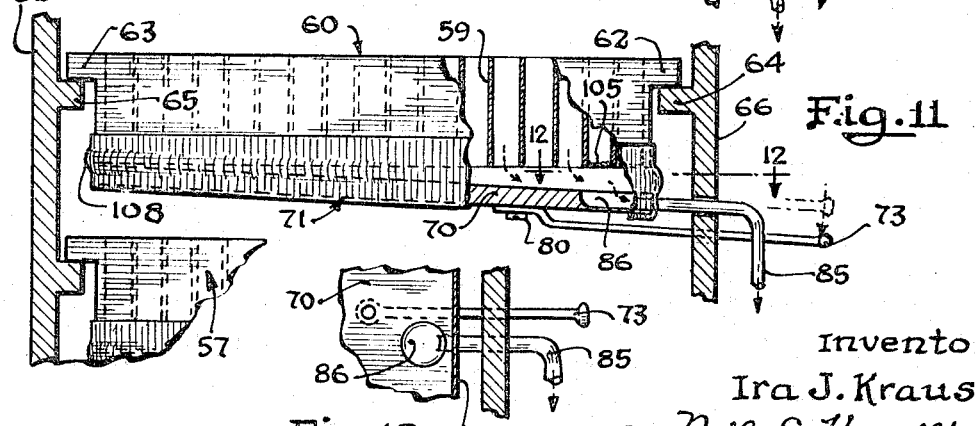

United States Patent Office 3,303,519
Patented Feb. 14, 1967

3,303,519
HONEYCOMB DEVICE FOR EXTERIOR
EXTRACTION OF HONEY
Ira Jay Krause, Winthrop Harbor, Ill.
(3201 Bethel Blvd., Zion, Ill. 60099)
Filed Apr. 14, 1965, Ser. No. 448,075
19 Claims. (Cl. 6—2)

This invention relates to a novel honeycomb apparatus. More particularly, the present invention is concerned with a honyecomb device which affords the automatic collection of honey from outside the beehive.

There is at present no honeycomb device commercially available which is simple in construction and at the same time allows for the efficient collecting of honey from outside of the beehive. Attempts to produce such devices have been made, as evidenced by Garriga in U.S. 2,223,561 as well as Sugano in U.S. 2,631,307. However, both of these devices are quite complicated in their construction and employ numerous moving parts and/or close tolerances in the parts employed. Another device for externally removing honey is shown by Mari in U.S. 2,799,037 wherein cutting means are used to decap the cells. Difficulties arise by using such a construction because the bees will attempt to place additional wax over the cut cells and make subsequent cutting very difficult.

It is therefore an object of the present invention to provide a novel honeycomb device which allows exterior removal of honey. It is another object of the present invention to provide a honeycomb apparatus which employs a minimum number of moving parts. It is still another object of the present invention to provide a novel honeycomb which is simple and easy to construct. These and other objects will be readily appreciated by reference to the detailed description to follow when considered in conjunction with the accompanying drawing wherein:

FIGURE 1 is a perspective view of one embodiment of the present invention showing several honeycomb units supported vertically in a frame.

FIGURE 2 is a perspective view of one of the comb units of FIGURE 1 in an open position.

FIGURE 3 is an end view in side elevation of one of the comb units showing a latching means therefor.

FIGURE 4 is a partial view in vertical section of one of the comb units supported in the frame of FIGURE 1.

FIGURE 5 is an end view in side elevation of one of the comb units in a closed position.

FIGURE 6 is a view like FIGURE 5 but showing the comb unit in an open position.

FIGURE 7 is a perspective view of another embodiment of the present invention illustrating the comb units in a horizontal position.

FIGURE 8 is a view in side elevation showing in detail the discharge means of the comb units of FIGURE 7.

FIGURE 9 is a perspective view of one of the comb units of FIGURE 7 with portions broken away to better illustrate the positioning of the honeycomb.

FIGURE 10 is a view in vertical section taken through the center of FIGURE 9 along line 10—10 and showing the comb unit in a closed position.

FIGURE 11 is a view like FIGURE 10 but showing the comb unit in an open position.

FIGURE 12 is a view in horizontal section taken along line 12—12 of FIGURE 11.

Briefly stated, the honeycomb device of this invention is comprised of one or more honeycomb units having a plate securely held against one surface of the comb cells and is separated therefrom by means operable from outside the hive. A flexible collection means extends below the comb into which the honey flows from the cells and then is preferably manifolded to a common receptacle.

In one embodiment of the present invention, shown in FIGURES 1-6, the plate member extends between vertically placed combs while in another embodiment, illustrated in FIGURES 7-12, it is disposed below horizontally placed combs. The horizontally placed comb offers an advantage over the vertically disposed one because fewer troughs need be employed to convey the honey to a common collecting means.

In the particular embodiment shown in FIGURES 1-6, several comb units such as shown generally by 10, 11, 12, 13 and 14 are aligned in a parallel manner and vertically disposed in rectangular hive, generally 16. The comb units are spaced apart in hive 16 both vertically and horizontally to permit access by bees. The comb units 10, 11, 12, 13 and 14 as well as those not numbered are duplicates and what is described for unit 10 is true of all the other units. Comb unit 10 has two opposing honeycombs 17 and 18, each containing a plurality of hexagonal cells 20 extending transversely therethrough except for a rectangular perimeter. Projections 21 and 22 extend from a center divider 23 disposed between combs 17 and 18 for the purpose of supporting the comb unit 10 in rectangular wooden frame, comprising hive 16, resting on brooder hive 19. Back wall 25 of hive 16 has an accommodating ledge 26 for engaging bar-like projection 22. In a similar manner, front wall 27 is also provided with a ledge 28 for bar 21.

Secured completely around dividing plate 23, except for extension by bars 21 and 22, and attached to the adjacent surfaces of combs 17 and 18 is flexible tape 30 which loosely bows beneath center divider 23 when combs 17 and 18 are secured against divider 23. Tape 30, at the top of unit 10, forms a hinge 31. A length of tubing 33 extends through wall 27 as best shown in FIGURE 4, communicating beneath the bottom of divider 23 at one end and with a common conduit 35 at the other. As is best seen in FIGURE 1, each comb unit is provided with a length of tubing such as 33 which is manifolded by common conduits 35 and 36 to a combined downspout and vent 37 leading to container 40.

As is best illustrated in FIGURES 2 and 3, two pegs 42 and 43 project from combs 17 and 18, respectively, for pivoting combs 17 and 18 toward and away from divider 23. Slots 45 and 46 in wall 27 allow for manipulation of pegs 42 and 43, respectively, from outside hive 16. Pivotally mounted on divider 23 is a latch 48 with notches 49 and 50 for engagement with pegs 42 and 43, respectively.

In FIGURE 7 another embodiment of the present invention is disclosed wherein rectangular wooden frame member generally 55 resting on brooder hive 54 has three horizontally disposed honeycomb units generally 56, 57 and 58 all of which are the same and are filled with hexagonal cells 59 except for a rectangular perimeter such as shown in T-shaped body section 60 of unit 56 in FIGURE 9. Comb 56 is supported in frame 55 by means of flanges 62 and 63, resting on ledges 64 and 65, respectively, of front and rear walls 66 and 67, respectively, of frame 55. Beneath comb 56 is a plate member 70 which is secured to comb unit 56 by flexible tape 71, a band of which is applied completely around the base of body section 60 as well as on plate member 70, preferably extending onto the bottom of the plate member, the area of plate member 70 being approximately the same as the bottom of body section 60. Plate 70 has an arm 73 or operating element extending outwardly through the front wall 66 of frame 55 by means of slot such as that shown at 75 for arm 73. In a similar manner, comb units 57 and 58 also each have an arm such as that shown at 78 and 79 as well as accommodating slots through wall 66. Arm 73 is secured to the bottom of plate 70 by screw 80, and a screw 115 tightening latch 81 pivotally mounted on front wall 66 is provided for arm 73, and similarly, latches hold arms 78 and 79 in open and closed positions.

A length of flexible tubing 85 is accommodated through wall 66 and passed through tape 71 to communicate with drain pit 86 which is a dished-out portion in plate 70. In a similar manner, lengths of tubing 88 and 89 are secured in drain pits (not shown) for comb units 57 and 58. Pegs 90 and 91 are disposed in wall 66 to hold tubing 85 in a non-operative position. Tubing 85, 88 and 89 all communicate with main downspout and vent tube 95 which leads to honey container 96.

As illustrated in FIGURES 10 and 11, comb unit 56 is spaced a short distance from top wall 100 of hive 55 to allow bees to work into cells 59. Comb units 56, 57 and 58 are spaced from each other as well as from side walls 101 and 102 for the same purpose.

Referring again to FIGURES 10 and 11, it will be noted that those cells in direct communication with drain pit 86 are sealed off at the bottom by means of wax 105. This is to prevent the bees from entering the drain pit and plugging the mouth of tube 85.

As was described for tape 30, tape 71 also forms a hinge 108 between plate member 70 and the wall surface of comb 60 which is oposite to the wall of the comb where tubing 85 lies beneath. In addition to forming a hinge, tape 71 as well as tape 30 provide a flexible sealing means by completely surrounding the comb units to prevent honey from flowing out between the comb units and divider plates when the plates are moved away from the comb units.

Drain pit 86 is shown to be of a circular configuration and extending a short distance from the mouth of tubing 85. The pit can be of any geometric design and can extend any distance along the edge of plate 70 in a manner somewhat parallel with front wall 66.

A description of the operation of the previously described embodiments will aid in better understanding the advantages of the present invention. Regarding the embodiment shown in FIGURES 1-6, all that is required for an operator to obtain honey from outside the hive is to move latch 48 in a manner so that notches 49 and 50 no longer engage pegs 42 and 43, as illustrated by the position of latch 48. Pegs 42 and 43 are then moved in slots 45 and 46 away from plate 23 to the oposite ends thereof. Before movement of the pegs 42 and 43, combs 17 and 18 will be in a position as shown in FIGURES 2 and 5. The previously described movement of the pegs will cause combs 17 and 18 to move away from plate 23 as shown in FIGURE 6 whereby combs 17 and 18 are upwardly titled from the horizontal and honey will run towards the plate 23 and down onto a trough 110 at the bottom formed by tape 30 and the abutment of tubing against the bottom of plate 23. From trough 110 the honey flows into conduit 33, common conduit 35, then into downspout 37 and ultimately in a receptacle 40 in the manner shown in FIGURE 1. To reset the combs 17 and 18 for the depositing of honey, the pegs are moved back toward plate 23 until abutment with the end of the slot and engagement with latch 48.

In operating the hive 55 as described in FIGURES 7-12, the normal closed position will be that shown with respect to comb unit 56 with bottom plate 70 positioned against the bottom of the comb 60 and against the bottoms of cells 59 as shown in FIGURES 9 and 10. When it is desired to collect the honey, flexible tubing 85 will be removed from pegs 90 and 91 so the tubing assumes a position shown in full lines in FIGURE 8. Latch screw 115 of latch 81 is loosened and arm 73 as well as arms 78 and 79 are then moved downwardly as indicated in FIGURE 11 and from outside hive 55 to cause floor plate 70 to move away from the botom of comb 60. As the plate 70 is moved downwardly it will move away from comb 60 as well as pitch toward front wall 66, thus depositing the honey from cells 59 into pit 86, which then deposits the honey into tubing 85. From tubing 85 as well as for the honey similarly deposited into tubing 88 and 89 the honey passes into drain spout 95 and ultimately into container 96. To place the comb units 56, 57 and 58 in a position for a subsequent depositing of honey by the bees, arms 73, 78 and 79 are merely moved upwardly until they engage the upper portions of their slots such as 75 to place the bottom plate as represented by 70 against the bottoms of the combs as illustrated for comb 60.

Tubing 85, 88 and 89 is then replaced over its adjacent pegs to provide a residual amount of honey to cover the bottom of the cells adjacent the plates should bees tend to wax any openings between the cells and the plates caused by warpage or poor fitting materials.

It will be noted that with plate 70 in the open position in FIGURE 11 and flexible tube 85 elevated between pins 90 and 91 a trap means is formed which still allows honey to flow out tube 85. This forms a truly automatic means of collecting honey when the honey flow season is in effect.

Thin flexible plastic tape 30 and 71 is made of a flexible plastic material preferably of the polypropylene or vinyl type. In the instance of combs 17, 18 and 60, the tape is fastened to the combs as well as to the respective adjacent plates 23 and 70 by solvent seal or heat seal. Plates 23 and 70 are made of polypropylene acrylic Plexiglas or vinyl chloride copolymer and combs 17, 18 and 60 as well as the remaining combs for all the comb units are produced from polypropylene vinyl chloride copolymer or acrylic Plexiglas. Combs 17 and 18 measure approximately six inches wide, eight inches high and two inches deep. All of the tubing, such as described at 33, 35, 37, 85, 88, 89 and 95, is preferably of the vinyl type but other plastic materials could be used such as those used to compose the combs, and solvent sealed or heat sealed in the comb units as will be apparent to those skilled in the plastic art.

In FIGURES 1 and 7 a conduit system is disclosed for conveying the honey from a certain number of comb units. It should be understood that any number of comb units can be integrally connected with the same tubing manifold system whether the comb units are extended horizontally or vertically. Alternatively, the manifold system can be eliminated and the honey gathered from each comb unit individually.

It will thus be seen that through the present invention there is now provided a novel beehive unit wherein the collection of honey can be effected automatically without entering the hive or disturbing the bees by moving the combs any considerable amount. Operating means and the collecting tubes are placed in the same wall of the hive for ease of collection. The hive unit is inexpensive to manufacture and is composed of a minimum number of parts. It is adaptable to being placed over a standard brooder hive. No complex moving mechanisms are required to cause the honey to flow to the outside of the hive. Further, uncapping the combs is no longer necessary as the honey can be collected before the bee fills the cells. Should, after some time, many of the cells become capped with wax, the comb units are easily removed and decapped as they are not fastened in the hives.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A beehive comprising in combination at least one honyecomb unit adapted to be supported in said beehive, said honeycomb unit comprising a comb with cells extending from one side to the other, a solid plate member for covering the ends of said cells at one side of said comb, combined hinging and sealing means attaching said plate to said comb and operable from outside said beehive to cause said plate member to move away from said comb and passage means adapted for collecting the deposited honey from outside said beehive when said plate member is moved away from said ends of said cells containing honey.

2. The beehive as defined in claim 1 wherein said passage means include a trap means.

3. The beehive as defined in claim 1 wherein said comb and said plate member are supported in said beehive in a vertical position.

4. The beehive as defined in claim 1 wherein said comb and said plate member are supported in said beehive in a horizontal position.

5. The beehive as defined in claim 1 wherein a plurality of honeycomb units are supported in said beehive and said passage means interconnects all of said honeycomb units.

6. The beehive as defined in claim 1 wherein said comb and said plate member are supported in said hive in a horizontal manner and said means provided to be operable from outside said hive unit to cause said plate to move away from said cells is an arm member extending through an accommodating slot in the wall of said beehive.

7. The beehive as defined in claim 1 wherein said means provided to be operable from outside said beehive and said passage means extend through the same wall of said beehive.

8. The beehive as defined in claim 1 wherein said beehive is adaptable to being placed over a standard brooder hive.

9. A beehive comprising in combination a frame member, at least one honeycomb unit adapted to be supported in said frame member in a vertical manner, each said honeycomb unit comprising two honeycombs, a solid plate member supported between said honeycombs at the top of said honeycombs to block the cells in said honeycombs, combined hinging and sealing means attaching said plate to said comb to flexibly seal said plate members between said honeycombs, means provided to be operable from outside said frame member to cause said honeycombs to move away from said plate member, and passage means adapted to be extended from the bottoms of said honeycombs to the outside of said frame member.

10. The beehive as defined in claim 9 wherein said passage means adapted to be extended between the bottoms of said honeycombs includes a length of flexible tubing.

11. The beehive as defined in claim 9 wherein said means to flexibly seal said plate member between said honeycombs is a length of flexible tape extending substantially completely around the edges of said plate member.

12. The beehive as defined in claim 11 wherein said means provided to be operable from outside said hive to cause said honycombs to move away from said plate member are two arm members carried by said honeycombs and extending through slots in the wall of said beehive.

13. A beehive comprising in combination at least one honeycomb unit adapted to be supported in a frame member in a horizontal manner, said honeycomb unit comprising a honeycomb, a solid plate member hingedly supported across the bottom of said honeycomb, hinging means provided to be operable from outside said frame member to cause said plate member to move away from the bottom of said honeycomb and also to position said plate member against the bottom of said honeycomb, and passage means adapted to be in communication with said plate member to transfer honey to the outside of said frame member, said hinging means and said passage means providing a residual amount of honey on said plate member when said plate member is moved away from said comb.

14. The beehive as defined in claim 13 wherein said means for operating said plate member includes a bar member extending through a slot in said frame.

15. The beehive as defined in claim 13 wherein said plate member has a pit disposed along the edge of said plate member which is moved the greatest distance from said honeycomb.

16. The beehive as defined in claim 15 wherein a length of tubing communicates with said pit.

17. The beehive as defined in claim 13 wherein the said hinging means also flexibly seals said plate member to said honeycomb.

18. A honeycomb unit for use in a beehive comprising two honeycombs, a solid plate member hingedly supported between said honeycombs to block the cells in said honeycombs, and combined hinging and flexible sealing means to seal said plate member between said honeycombs.

19. A honeycomb unit for use in a beehive comprising a honeycomb, a solid plate member hingedly supported at the bottom of said honeycomb and combined hinging and flexible sealing means sealing said plate member to the bottom of said honeycomb.

References Cited by the Examiner

UNITED STATES PATENTS

| | | | |
|---|---|---|---|
| 890,397 | 6/1908 | Avant | 6—12 |
| 1,051,830 | 1/1913 | Calkins et al. | 6—11 |
| 2,631,307 | 3/1953 | Sugano | 6—2 |
| 2,779,037 | 1/1957 | Rovira Mari | 6—11 |

FOREIGN PATENTS

| | | |
|---|---|---|
| 592,090 | 9/1947 | Great Britain. |

SAMUEL KOREN, *Primary Examiner.*

LUCIE H. LAUDENSLAGER, *Examiner.*